Figure 1:
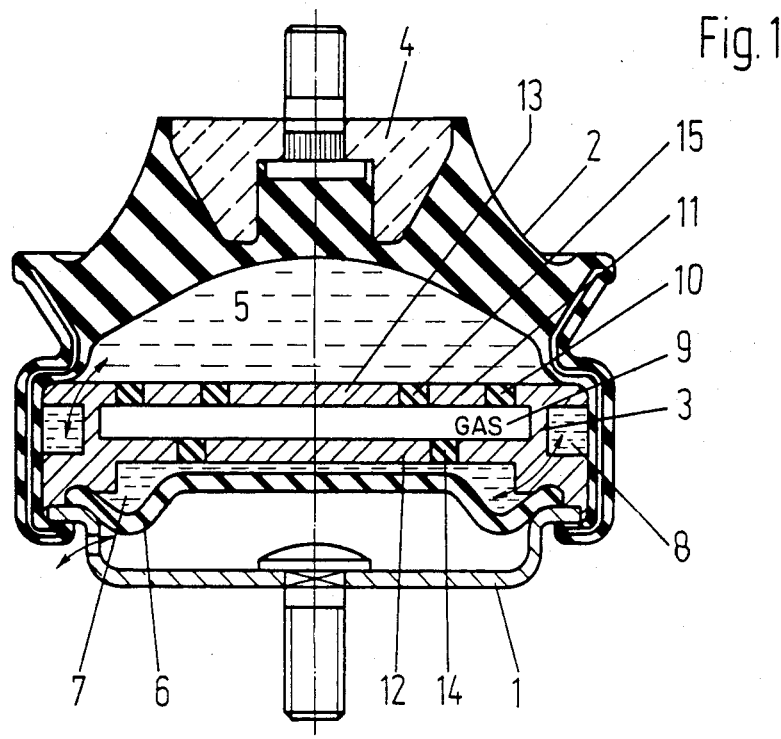

United States Patent [19]

Sciortino

[11] Patent Number: 4,638,981

[45] Date of Patent: Jan. 27, 1987

[54] ENGINE MOUNT

[75] Inventor: Giacomo Sciortino, Heidelberg, Fed. Rep. of Germany

[73] Assignee: Firma Carl Freudenberg, Weinheim, Fed. Rep. of Germany

[21] Appl. No.: 788,419

[22] Filed: Oct. 17, 1985

[30] Foreign Application Priority Data

Jan. 15, 1985 [DE] Fed. Rep. of Germany ....... 3501112

[51] Int. Cl.⁴ ..................... B60G 13/00; F16M 13/00
[52] U.S. Cl. ............................... 267/8 R; 267/140.1; 267/35; 92/48; 248/559
[58] Field of Search ............ 267/140.1, 8 R, 35, 267/64.15, 152; 188/298; 248/559, 562, 565, 566, 603, 636; 123/192 R, 192 B; 92/48

[56] References Cited

U.S. PATENT DOCUMENTS

| 4,437,653 | 3/1984 | Kakimoto | 267/140.1 |
| 4,492,366 | 1/1985 | Ozawa et al. | 248/636 |
| 4,570,911 | 2/1986 | Konishi | 267/8 R |
| 4,573,656 | 3/1986 | Yoshida et al. | 267/140.1 |

FOREIGN PATENT DOCUMENTS

| 98331 | 1/1984 | European Pat. Off. | 267/140.1 |
| 110197 | 6/1984 | European Pat. Off. | 267/140.1 |
| 3125040 | 3/1983 | Fed. Rep. of Germany | 248/559 |
| 76340 | 5/1982 | Japan | 267/140.1 |
| 2041488 | 9/1980 | United Kingdom | 267/140.1 |

Primary Examiner—Andrew V. Kundrat
Assistant Examiner—Anthony Knight
Attorney, Agent, or Firm—Felfe & Lynch

[57] ABSTRACT

A hydraulically damped engine mount comprising a working space bounded by a mounting bracket, a supporting spring and a partition wall, and an equalizing space bounded by the partition wall and by a resilient buffer wall, which are interconnected through a throttle opening and are filled with a liquid, as well as a gas-filled chamber which is disposed within the partition wall and is closed relative to the working space by means of a circular disk suspended from an elastic annular diaphragm thereof, the disk being a chain vibrator which comprises at least two successive, radially interposed neutralizing masses that are elastically secured to each other and to the partition wall by means of annular diaphragms.

4 Claims, 2 Drawing Figures

ENGINE MOUNT

The invention relates to a hydraulically damped engine mount comprising a working space bounded by a mounting bracket, a supporting spring and a partition wall, and an equalizing space bounded by the partition wall and by a resilient buffer wall, which are interconnected through a throttle opening and are filled with a liquid, as well as a gas-filled chamber which is disposed within the partition wall and is closed relative to the working space preferably by means of a circular disk suspended from an elastic annular diaphragm thereof.

An engine mount of this type is disclosed in European Pat. application No. 0115 417. It exhibits good isolating action for high-frequency vibrations and good damping action for low-frequency vibrations under 30 Hz. However, when these two types of vibrations are introduced in mixed form, as, for example, when the vehicle passes over uneven ground at high speed, the isolating action is greatly impaired.

This is the point of departure for the invention. The latter has as an object to improve an engine mount of the type described at the outset in such a way that when both low-frequency and high-frequency vibrations are introduced, good isolation of the high-frequency vibrations is obtained along with good damping of the low-frequency vibrations. In accordance with the invention, this object is accomplished in that the disk is a chain vibrator which comprises at least two successive, radially interposed neutralizing masses that are elastically secured to each other and to a partition wall by means of annular diaphragms.

The operation of the engine mount of the invention is probably due to the fact that the individual neutralizing masses assembled to form a chain vibrator influence one another with respect to their mobility, these neutralizing masses being supported as a whole on the gas-pressure cushion contained in the chamber. Their elastic suspension therefore continually undergoes variation as a function of the forces introduced. The result is good compensation of high-frequency vibrations. A decided advantage is that this desirable action occurs also when low-frequency vibrations are simultaneously introduced into the engine mount.

In designing the inventive engine mount for the support of conventional automotive engines, it has been found advantageous for the ratio between the combined neutralizing masses and the proportionate mass of the engine to be not greater than 0.1, and for the ratio between the spring rate of each annular diaphragm and the spring rate of the supporting spring to be not greater than 1.0. It should be noted that when one of these two parameters is varied, the other parameter should be adjusted in the same sense. The rough adjustment may be made on the basis of theoretical calculations, which requires no further explanation here. The fine adjustment may be made as the motor vehicle equipped with the engine mount of the invention is being test-driven under normal operating conditions.

A further improvement in effectiveness is achieved when the ratio between the hydraulically effective piston surface area of the pedestal secured to the supporting spring and the corresponding hydraulically effective surface area of each neutralizing mass ranges from 1 to 16, and preferably from 2 to 8. The first of these surface areas, the piston surface area, represents about two-thirds of the surface area obtained by projecting the underside of the pedestal and of the supporting spring onto a surface extending perpendicularly to the direction of their motion. The second surface area is the area of the similar projection of each neutralizing mass, increased by 50 percent of the similarly projected surface area of the adjacent annular diaphragms.

All annular diaphragms used in the engine mount of the invention are constructed so that they can be deformed without appreciable damping effort. The result is a particularly marked neutralizing action. The neutralizing masses used preferably weigh from 10 to 200 grams when the inventive engine mount is designed for automotive engines generally, and usually from 10 to 50 grams in the case of a passenger-car engine mount. The neutralizing masses and the associated annular diaphragms need not be absolutely circular. For example, oval or polygonal designs can also be used.

In accordance with the invention, a hydraulically damped engine mount comprises a mounting bracket, a supporting spring and a partition wall bounding a working space, and a resilient buffer wall, the resilient buffer wall and the partition wall bounding an equalizing space, the working space and the equalizing space being interconnected through a throttle opening. The engine mount also includes a liquid filling the working space and the equalizing space, a gas-filled chamber which is disposed within the partition wall, and a disk suspended from the partition wall and closing the chamber, the disk being a chain vibrator comprising at least two successive, radially interposed neutralizing masses and annular diaphragms for elastically securing the neutralizing masses to each other and to the partition wall.

Figure 2:
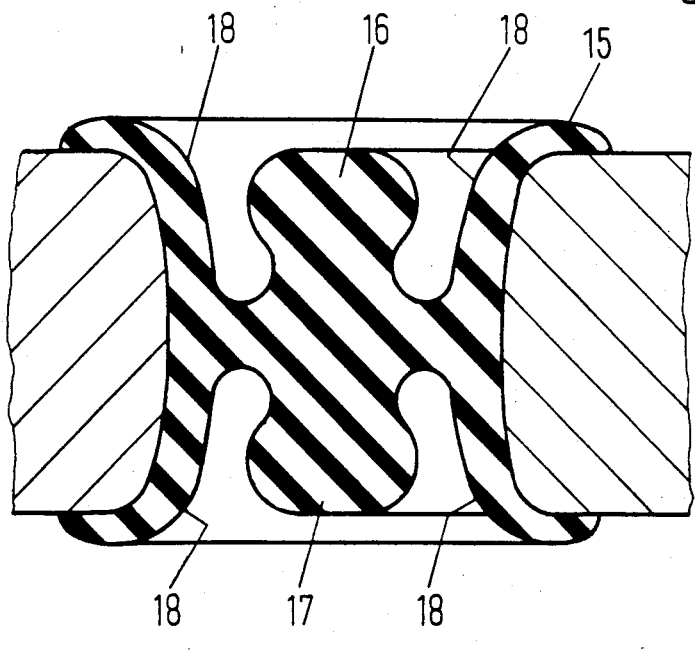

The invention will now be described in greater detail with reference to the accompanying drawings, wherein:

FIG. 1 is a longitudinal section of an exemplary embodiment of the engine mount of the invention, and FIG. 2 is a fragmentary, sectional view of one half of an annular diaphragm with adjacent metal members used in FIG. 1.

The engine mount shown in FIG. 1 comprises a mounting bracket 1 and a pedestal 4, which are united through a supporting spring 2 preferably of elastomeric material, for example, rubber and preferably having the shape of a hollow cone.

Preferably the mounting bracket 1 is cup-shaped and adjoins the underside of a partition wall 3, against which it is sealed by means of the beaded edge of a buffer wall 6, preferably made of a resilient elastomeric material, for example, rubber. The buffer wall 6 and the underside of the partition wall 3 together enclose an equalizing space 7, while preferably the pedestal 4, the supporting spring 2 and the partition wall 3 bound a working space 5. The latter is connected through a throttle opening 8 with the equalizing space 7 and, like the latter, preferably is filled with a liquid, generally water to which an antifreeze has been added. The space between the buffer wall 6 and the mounting bracket 1 preferably is vented so that pressure cannot build up in that space when the buffer wall 6 is being deformed.

The partition wall 3 incorporates a gas-filled chamber 9. The pressure there preferably is adjustable and may be above or below atmospheric pressure.

Chamber 9 preferably is bounded relative to the working space 5 by annular disk 11, and by circular disk 13, which are neutralizing masses, and by annular diaphragms 10 and 15 which link the disks in a chainlike manner to one another and to the partition wall 3. Said diaphragms preferably are of elastomeric material, for example, rubber, and have elastic properties, and the disks therefore undergo displacement when the pressure in the working space changes. In the process, they interact with one another as a function of their mass, of the elasticity of the annular diaphragms, and of the frequency of the vibrations introduced.

FIG. 2 is a fragmentary, sectional view of one half of a typical one the annular diaphragms with adjacent metal members used in FIG. 1, for example, a sectional view of a portion of the diaphragm 15. Preferably characterized in that the annular diaphragms are provided on their opposed sides with axial annular projections 16 and 17 which have a mirror-image relationship with each other, and that there are associated with and spaced from the radial boundary surfaces of said annular projections abutment surfaces 18 of further annular projections which have a mirror-image relationship with each other and with the annular projections 16 and 17. The axial displaceability of the disks held by the annular diaphragms is thus limited to a value that is determined by the contact between the abutment surface 18 and the opposite annular projection 16 or 17. Because of the rounding, such contact is noiseless, which is a great advantage so far as driving comfort is concerned.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

I claim:
1. A hydraulically damped engine mount comprising:
a mounting bracket;
a supporting spring and a partition wall bounding a working space;
a resilient buffer wall, the resilient buffer wall and the partition wall bounding an equalizing space, the working space and the equalizing space being interconnected through a throttle opening;
a liquid filling the working space and the equalizing space;
a gas-filled chamber which is disposed within the partition wall; and
a disk suspended from the partition wall and closing the chamber, said disk being a chain vibrator comprising at least two successive, radially interposed neutralizing masses and annular diaphragms for elastically securing said neutralizing masses to each other and to the partition wall.

2. An engine mount according to claim 1, in which the neutralizing masses have a combined weight of from 10 to 200 grams.

3. An engine mount according to claim 2, in which the radially interposed annular diaphragms are each provided with two axial annular projections which have a mirror-image relationship with each other, and in which there are associated with and spaced from the radial boundary surfaces of said annular projections abutments which have a mirror-image relationship with each other and with said annular projections.

4. An engine mount according to claim 1, in which said disk is a circular disk.

* * * * *